Mar. 6, 1923.                                              1,447,488.
H. SCHNEIDER.
OIL ENGINE DRIVEN LOCOMOTIVE.
FILED JULY 7, 1922.
2 SHEETS—SHEET 1.
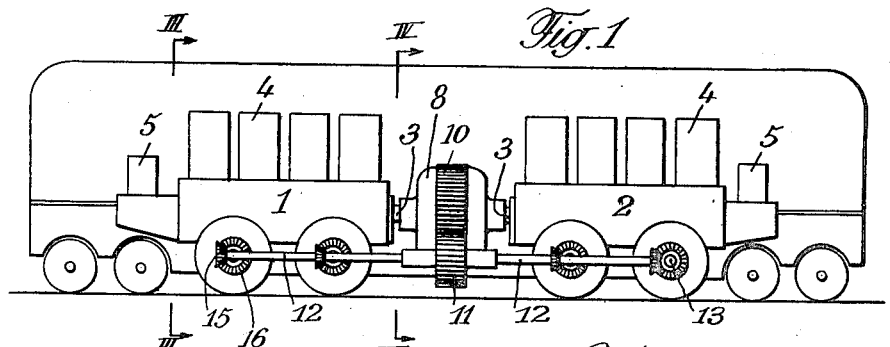
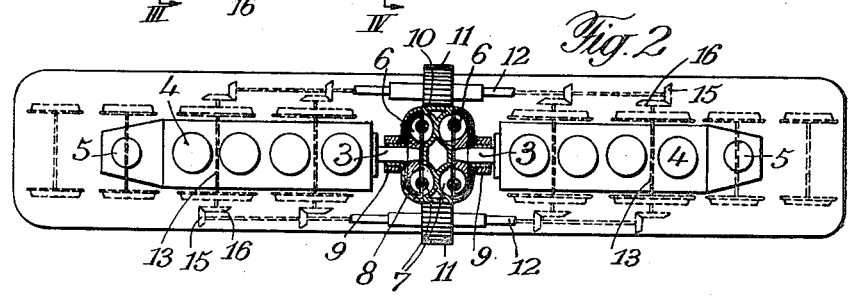
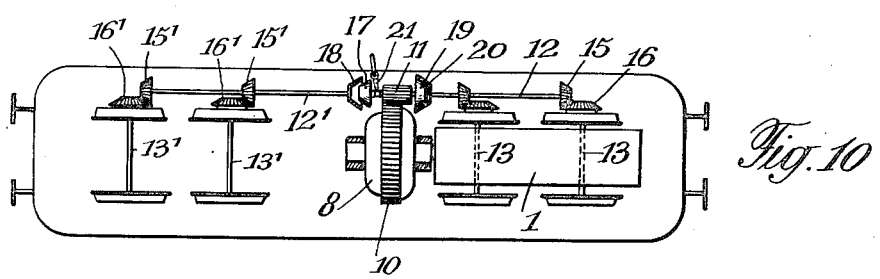
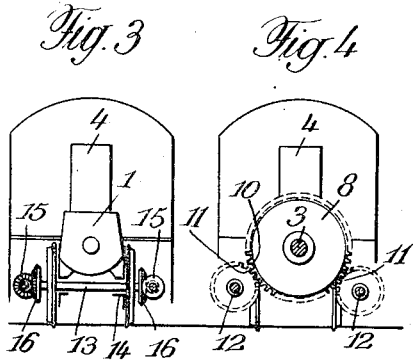
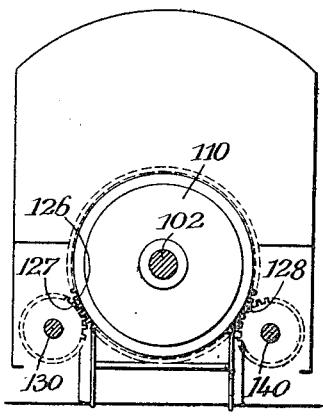
Inventor:
Heinrich Schneider
By Harry Orth Jr
atty.

Mar. 6, 1923.

H. SCHNEIDER.
OIL ENGINE DRIVEN LOCOMOTIVE.
FILED JULY 7, 1922.

Inventor:
Heinrich Schneider
By Henry Orth Jr
Atty.

Patented Mar. 6, 1923.

1,447,488

UNITED STATES PATENT OFFICE.

HEINRICH SCHNEIDER, OF ILLNAU, SWITZERLAND.

OIL-ENGINE-DRIVEN LOCOMOTIVE.

Application filed July 7, 1922. Serial No. 573,387.

*To all whom it may concern:*

Be it known that I, HEINRICH SCHNEIDER, a citizen of the Republic of Switzerland, residing at Illnau, Canton of Zurich, Switzerland, have invented certain new and useful Improvements in Oil-Engine-Driven Locomotives, of which the following is a specification, reference being had therein to the accompanying drawing.

The present invention relates to improvements in oil-engine driven locomotives. According to the invention the locomotive is provided with at least one oil-engine the shaft of which is arranged in the longitudinal direction of the locomotive, the engine driving through the intermediary of at least one fluid operated transmission gear at least one longitudinally arranged counter-shaft from where the driving axles are singly driven by means of bevel wheels or screw wheels.

Preferably fluid operated transmission gears are provided adapted to effect a change of the transmission ratio, but mechanically operated couplings may be utilized to this end. A locomotive according to the invention is adapted to meet the various working conditions, for instance developing a great speed and a small pulling force when travelling over flat stretches, developing a small speed and a great pulling force when steep gradients have to be overcome, effectively starting a train, travelling ahead and astern without reversing the oil engine, etc.

It is already known to utilize fluid operated transmission gears with oil-engine driven locomotives for the sole purpose of overcoming the difficulties of starting the locomotive. The combination of one or more fluid operated transmission gears with toothed gearings with the locomotive according to the present invention ensures an efficient working of the locomotive and adapts the latter to travel over railway lines in hilly countries. The different transmission ratios make it possible to run the oil-engine or the oil-engines with the most efficient speed over all the stretches.

The direct transmission of the output of the oil-engine by means of toothed gearings is liable to working difficulties owing to the cyclic variation of the torsional movement of the oil-engine, but these variations are successfully damped by means of the fluid operated transmission gears.

Several constructional examples of the object of the present invention are illustrated on the accompanying drawings, in which:

Fig. 1 shows diagrammatically an elevation of an oil-engine driven locomotive,

Fig. 2 is a plan view of Fig. 1, and

Figs. 3 and 4 are cross-sections along the lines III—III and IV—IV respectively of Fig. 1.

Fig. 7 is a cross-section on an enlarged scale along line VII—VII of Fig. 6 through the main gearing.

Fig. 10 is a plan view of a further constructional example of an oil-engine locomotive and Fig. 11 illustrates a detail.

Figure 6:
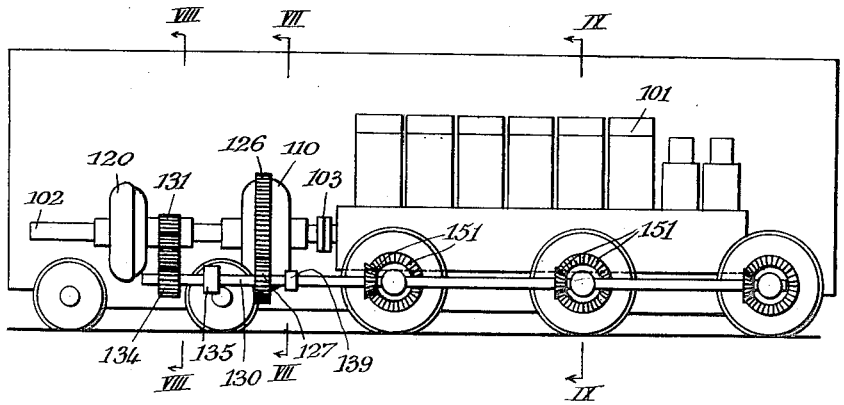
Fig. 6 is an elevation of the locomotive according to Fig. 5.
Figure 5:
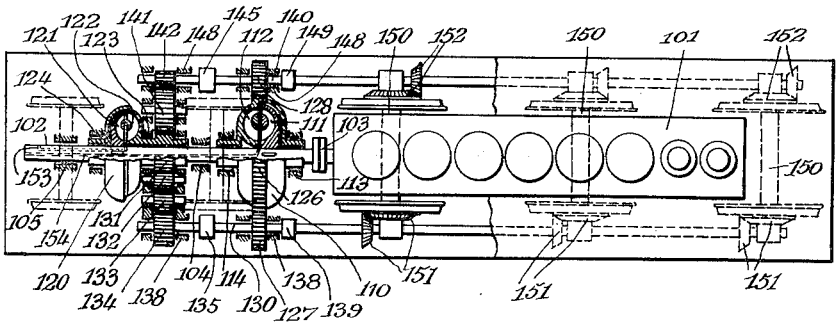
Fig. 5 is a plan view partly in section of a second constructional example.
Figure 8:
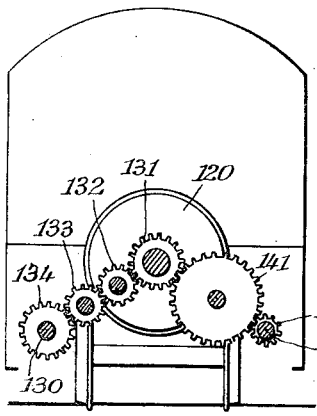
Fig. 8 is a cross-section along line VIII—VIII of Fig. 6 through the starting and the reversing gearing of the locomotive.
Figure 9:
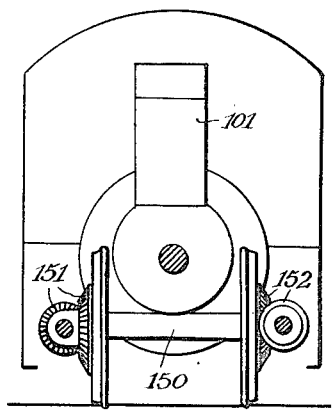
Fig. 9 is a cross-section along line IX—IX of Fig. 6, showing the oil-engine, a driving axle and the bevel gear for actuating the latter.

In the constructional example illustrated in Figs. 1–4, the locomotive is driven by two oil-engines 1 and 2, which are independent of each other, the shafts 3 of the engines being arranged in the longitudinal direction of the locomotive. Each oil engine is provided with four working cylinders 4 and an air pump cylinder 5. The two engine shafts 3 which are in alignment, are each provided at their ends pointing towards each other with a primary impeller wheel 6 of a fluid operated transmission gear, the secondary wheels 7 of which are united and are integral with the casing 8 of the gear. The liquid inside the gear circulates in two hollow spaces which are separated from each other, so that each engine may work separately. The casing 8 which is rotatably mounted in bearings 9 carries a toothed rim 10 meshing with gear wheels 11 provided on the two longitudinal counter shafts 12.

The oil engines 1 and 2 are rigidly connected to the locomotive frame as well as the bearings 9 of the fluid operated transmission gear and the bearings of the longitudinal countershaft to either side of the gear wheels 11. The driving axles 13 are mounted in bearings 14 in which the locomotive frame is resiliently supported, the arrangement of the springs being not shown in the diagrammatic drawings. Bevel wheels 15 are provided on the countershafts 12, and the bevel wheels 15 co-operate with bevel wheels 16 fixed to the driving axles 13. By this arrangement the driving axles 13 are singly driven by the longitudinal countershafts. Instead of bevel wheels worm wheels may be used. In order to ensure the proper engagement of the bevel wheels during the play of the springs universal joints may be inserted in the longitudinal countershafts as is shown in the constructional example illustrated in Figs. 6–9.

In the above described example of a locomotive the driving axles are driven from either end in order to reduce the load transmitted by one pair of bevel wheels. In case one pair of bevel wheels is able to transmit the total load per driving axle a one sided drive of the latter is preferably adopted. A drive of this nature is illustrated in Fig. 10, in which countershafts 12 and 12′ are provided only on one side of the locomotive. The countershaft 12, which is driven from the oil-engine 1 by the intermediary of the fluid operated transmission gear 8 and gear wheels 10, 11 and which actuates the driving axles by means of the bevel wheels 15, 16, serves for the travelling ahead of the locomotive, whilst the countershaft 12′ operates the driving axles 13′ by means of the bevel wheels 15′, 16′ when the locomotive travels astern. A diagrammatically illustrated coupling device 17, 18, 19, 20, 21 serves to render the countershaft 12 operative and to render the countershaft 12′ inoperative and vice versa.

With oil-engine driven locomotives the reversal of the locomotive may be carried out in the following ways:

The oil-engine may be designed as a reversible engine.

A reversible fluid operated transmission gear may be utilized.

Two bevel wheels may be provided on the countershaft for every bevel wheel of the driving axle, one of said bevel wheels being brought into engagement for running ahead and the other for running astern.

Change speed or reversing gear of a similar type to those provided with automobiles may be used. With a one sided drive of the driving axles the drive on one side may be used for astern running and the drive on the other side for ahead running of the locomotive, whereby suitable devices for coupling and uncoupling the shafts will have to be provided.

In Figs. 5–9 of the accompanying drawings a further constructional example of an oil-engine driven locomotive is shown in which the reversing of the locomotive is solved in a different way and in which several speed ratios are provided in the drive of the locomotive to adapt the latter to various conditions as to the train load and to the gradients of the track.

The vertical multi-cylinder engine 101 is arranged with its shaft extending in the longitudinal direction of the locomotive, the engine crank shaft is rigidly connected by means of a universal joint 103 to the shaft 102 of the fluid operated transmission gears. The shaft 102 is carried in the bearings 104 and 105 which, as well as the oil-engine base plate are rigidly fixed to the locomotive frame. On the shaft 102 the two fluid operated transmission gears 110 and 120 are arranged, the primary wheels 111 and 121 respectively being rigidly connected to the shaft 102, whilst the secondary parts together with the impellers 112 and 122 respectively are integral with the casings which enclose the primary parts; the casings are rotatably mounted in the bearings 113 and 114 and 123 and 124 respectively.

The secondary part of the transmission gear 110 is provided with a toothed rim 126 which co-operates with the gear wheels 127 and 128 fixed to the longitudinal countershafts 130 and 140 respectively. The secondary part of the transmission gear 120 is rigidly connected, preferably integral, with the toothed rim 131 which drives the countershaft 130 by means of the gear wheels 132, 133, 134 and the countershaft 140 is driven from the toothed rim 131 by means of the gear wheels 141 and 142.

The shafts 130 and 140 are provided with the diagrammatically indicated couplings 135 and 145 respectively, which couplings are as a rule only clutched in when the engine is at a stand-still, but which may be clutched in and out when the engine runs at no load or at a small load. The countershaft 130 is rotatably mounted in the bearings 138, and the shaft 140 is mounted in the bearings 148, which bearings are rigidly connected to the locomotive frame. The shafts 130 and 140 actuate, through universal couplings 139 and 149 respectively, and pairs of bevel wheels 151 and 152 respectively the driving axles 150.

Figure 11:
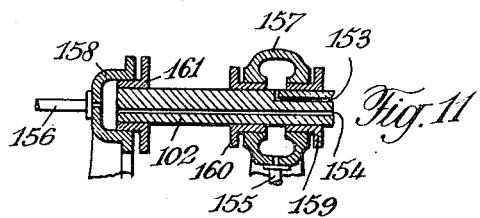

The supply and the discharge of the working fluid for the transmission gears is effected through bores of the shaft 102 to which conduits 155, 156 (Fig. 11) are connected by means of the hollow ring 157 and the cap 158 respectively. Stuffing boxes 159, 160, 161 are provided for preventing an escape of the fluid between the stationary parts, i. e. ring 157, cap 158 and the rotating shaft 102. The supply of air under pressure for blowing out the fluid and for emptying thereby the gear may be carried out in a similar way. The filling and emptying of the transmission gears may be effected by actuating a lever which influences valves or other means adapted to control the supply and discharge conduits for air under pressure and water.

The above described oil-engine locomotive is operated in the following manner:

When starting the locomotive the oil-engine 101 is started up under no load with for instance idle transmission gears 110 and 120 by means of air under pressure in the same manner as a stationary oil-engine. Thereafter the transmission gear 120 is filled, the coupling 145 being clutched out and the coupling 135 being clutched in during that time. The engine is brought to its normal speed when the torque of the secondary part of the fluid operated transmission gear 120 is transmitted by means of the gear wheels 131—134 to the counter-shaft 130 and from there through coupling 135, universal coupling 139, bevel wheels 151 to the driving axles 150, the other half of the engine output being transmitted from the shaft 130 by means of the gear wheel 127, the toothed rim 126 of the empty running transmission gear 110 and gear wheel 128 to the shaft 140 and from there through the universal joint 149 and the bevel gears 152 to the other side of the driving axles 150. The gear wheels 141 and 142 run idle, the direction of rotation of the gear wheel 142 being opposite to that of the shaft 140.

Let it now be assumed that the locomotive has to drive a fast train. Then, after the train has reached approximately one third of its normal speed, the transmission gear 110 is filled and at the same time the transmission gear 120 is emptied. The output of the oil-engine is now transmitted from the toothed rim 126 of the secondary part of the transmission gear 110 to the two counter-shafts 130 and 140 by means of the gear wheels 126 and 128 and from there to the driving axles 150. In this case the gear wheels 131—134 as well as the gear wheels 141 and 142 and the transmission gear 120 run idle. When the coupling 135 is inoperative these gears remain stationary and only the primary wheel 121 rotates idly in the empty transmission gear 120.

In order to stop the train the lever controlling the fuel supply to the engine is brought into the no-load position and the brakes on the driving wheels are actuated in the ordinary manner. The oil-engine continues to rotate at a reduced speed, whilst the secondary part 112 of the transmission gear 110 is brought to a standstill by the action of the brakes on the driving wheels which is transmitted to said secondary part by means of the power transmission means interposed between the transmission gear and the driving axles. During the standstill the coupling 135 is clutched in again, transmission gear 110 is emptied and transmission gear 120 is filled and the above described sequence of operation for starting the locomotive is repeated.

When a railway line consisting of flat stretches alternating with very steep gradients has to be travelled along, the steep gradients may be overcome by utilizing transmission gear 120 and during the travelling over the flat stretches the transmission gear 110 may be rendered operative without clutching out the coupling 135, so that the gear wheels 131—134, and 141 and 142 as well as the secondary part 122 rotate idly and one or the other speed ratio may be made use of without having to actuate the coupling.

In the following the transmission gear 110 together with the gear-wheels 126—128 is designated as main gear,—the transmission gear 120 together with the gear wheels 131—134 as starting gear and the transmission gear 120 together with the gear wheels 141 and 142 is designated as reversing gear.

For carrying out the reversing of the locomotive it is assumed that the oil-engine is not reversible. When travelling astern the coupling 135 is clutched out and the coupling 145 is clutched in when the oil-engine is at a stand-still. The oil-engine is started in the same manner as for travelling ahead and the output is transmitted to the driving axles by means of the filled transmission gear 120, the gear wheels 141 and 142, coupling 145, shaft 140, universal joint 149 and bevel wheels. One half of the output is transmitted from the shaft 140 to the driving axles through the gear wheels 128, the idle running secondary part of the transmission gearing 110, gear wheel 126, countershaft 130, and universal joint 139. During the astern running the gear wheels 132—134 rotate idly and gear wheel 134 rotates in the opposite direction to that of gear wheel 126.

When a reversible oil-engine is provided the wheels 141 and 141 of the reversing gear and coupling 145 or the starting gear (wheels 132—135) may be omitted. With the arrangement as described above and as illustrated a third transmission ratio for ahead running may be obtained by running the oil-engine in the reversed direction and cutting in the reversing gear. The afore described arrangement provides when utilizing a reversible oil-engine for ahead and for astern running for three different speed ratios of the locomotive, i. e. two ratios for running ahead and one for running astern when the oil-engine rotates in its normal direction of rotation, and one speed ratio for ahead and two for astern running when the engine is reversed.

Obviously instead of the reversing gear 131, 141, 142 a third speed ratio for running ahead might be provided when the reversal of the direction of running of the locomotive is carried out by reversing the engine.

It is preferable to utilize couplings 135 and 145 which can be clutched in and out during the working, in which case the speeds can be changed during the travel of the locomotive. To this end couplings are very suitable which consist in the combination of friction couplings and jaw couplings. The friction coupling serves as a kind of preliminary coupling when starting the transmission gears, and the jaws only enter into engagement when the shafts to be coupled together have both attained the same speed. It is essential that the coupling is clutched in and out at no load which is rendered possible through emptying the fluid operated transmission gear; in this way difficulties in operating the coupling are overcome. The working of the friction coupling is also rendered easier by the fluid operated transmission gear.

With locomotives of large outputs a second oil-engine may be coupled to the free end of the shaft 102 in the manner shown in Fig. 1.

The aforedescribed arrangement presents special advantages for the braking of the train. Especially during a continued downhill travelling the braking may be effected by filling both fluid operated transmission gears when the oil-engine stands still or runs at no load. Both transmission gears may thereby rotate in the same direction or in opposite directions depending upon whether coupling 135 or 145 is clutched in. When the transmission gears rotate in opposite directions the braking is very effective so that the usual braking of the train by mechanical means may be replaced to a great deal by a water braking action.

I claim:

1. In an oil-engine driven locomotive, the combination of at least one oil-engine the shaft of which is arranged in the longitudinal direction of the locomotive, at least one fluid operated transmission gear the driving parts of which are connected to the engine shaft and the driven parts being provided with toothed rims, at least one counter shaft arranged longitudinally of the locomotive, gear wheels interposed between said counter-shaft and said toothed rim on the driven part of the transmission gear, driving axles, and gearings interposed between said counter-shaft and said driving axles for singly actuating the latter.

2. In an oil-engine driven locomotive, the combination of at least one oil-engine the shaft of which is arranged in the longitudinal direction of the locomotive, a plurality of fluid operated transmission gears, the driving parts of which are connected to the engine shaft and the driven parts being integral with the gear casings, the latter being provided with toothed rims, at least one counter-shaft arranged longitudinally of the locomotive, gear wheels interposed between said counter shaft and said toothed rims on the driven parts of the transmission gears, driving axles, and bevel gears interposed between said counter-shaft and said driving axles for singly actuating the latter.

3. In an oil-engine driven locomotive, the combination of at least one oil-engine the shaft of which is arranged in the longitudinal direction of the locomotive, a plurality of fluid operated transmission gears, the driving parts of which are connected to the engine shaft and the driven parts being integral with the gear casings the latter being provided with toothed rims, at least one counter-shaft arranged longitudinally of the locomotive, sets of gear wheels interposed between said counter-shaft and said toothed rims on the driven parts of the transmission gears for providing for different speed ratios, means adapted to render any of said gear wheel sets operative and to render other sets inoperative, driving axles, and bevel gears interposed between said counter-shaft and said driving axles for singly actuating the latter.

4. In an oil-engine driven locomotive, the combination of at least one-oil engine the shaft of which is arranged in the longitudinal direction of the locomotive, a plurality of fluid operated transmission gears, the driving parts of which are connected to the engine shaft and the driven parts being integral with the gear casings the latter being provided with toothed rims, at least one counter-shaft arranged longitudinally of the locomotive, sets of gear wheels interposed between said countershaft and said toothed rims on the driven parts of the transmission gears for providing for different speed ratios, one of said sets of gear wheels being adapted to reverse the direction of running of the locomotive, disengageable coupling means provided in said counter-shaft and adapted to render any of said gear wheel sets operative and other sets inoperative, driving axles, and bevel gears interposed between said countershaft and said driving axles for singly actuating the latter.

5. In an oil-engine driven locomotive, the combination of at least one oil-engine the shaft of which is arranged in the longitudinal direction of the locomotive, a plurality of fluid operated transmission gears, the driving parts of which being connected to the engine shaft and the driven parts are provided with toothed rims, means adapted to supply and discharge fluid to said transmission gears for rendering the latter operative and inoperative, at least one counter-shaft arranged longitudinally of the locomotive, sets of gear wheels interposed between said counter-shaft and said toothed rims on the driven parts of the transmission gears for providing for different speed ratios, means adapted to render any of said gear wheel sets operative and to render other sets inoperative, driving axles, and bevel gears interposed between said counter-shaft and said driving axles for singly actuating the latter.

6. In an oil-engine driven locomotive, the combination of an oil engine the shaft of which is arranged in the longitudinal direction of the locomotive, a first fluid operated transmission gear having its primary part rigidly connected to the engine shaft, its secondary part being integral with the gear casing and provided with a toothed rim, a second fluid operated transmission gear having its primary part rigidly connected to the engine shaft, its secondary part being integral with the gear casing and provided with a toothed rim, two counter-shafts one on each side of the locomotive, a gear wheel on each of said counter-shafts co-operating with the toothed rim of the first transmission gear, a set of gear wheels interposed between the second transmission gear and one of said counter-shafts and adapted to actuate the latter at a different speed and in the same direction of rotation as it is actuated by the first transmission gear, a second set of wheels interposed between the second transmission gear and the other of said counter-shafts and adapted to actuate the latter in the opposite direction of rotation to that in which it is actuated by the first transmission gear, disengageable coupling means inserted in said counter-shafts and adapted to render one of said sets of gear wheels operative and the other inoperative, means adapted to supply and discharge fluid to said transmission gears for rendering the latter operative and inoperative, driving axles, and bevel gears interposed between said counter-shafts and said driving axles for singly actuating the latter.

In testimony whereof I affix my signature.

HEINRICH SCHNEIDER.